United States Patent
Nordholt et al.

(10) Patent No.: US 10,044,504 B2
(45) Date of Patent: Aug. 7, 2018

(54) LONG-HAUL HIGH RATE QUANTUM KEY DISTRIBUTION

(71) Applicant: Los Alamos National Security, LLC, Los Alamos, NM (US)

(72) Inventors: Jane E. Nordholt, Los Alamos, NM (US); Richard J. Hughes, Los Alamos, NM (US); Raymond T. Newell, Santa Fe, NM (US); Charles G. Peterson, Los Alamos, NM (US); Rolando D. Somma, Santa Fe, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 971 days.

(21) Appl. No.: 14/333,419

(22) Filed: Jul. 16, 2014

(65) Prior Publication Data
US 2018/0198608 A1    Jul. 12, 2018

Related U.S. Application Data

(60) Provisional application No. 61/847,002, filed on Jul. 16, 2013.

(51) Int. Cl.
| | |
|---|---|
| *H04L 9/08* | (2006.01) |
| *H04L 9/32* | (2006.01) |
| *H04B 10/508* | (2013.01) |
| *H04B 10/70* | (2013.01) |
| *H04B 10/516* | (2013.01) |
| *H04B 10/85* | (2013.01) |

(52) U.S. Cl.
CPC ......... *H04L 9/0852* (2013.01); *H04B 10/508* (2013.01); *H04B 10/5165* (2013.01); *H04B 10/70* (2013.01); *H04B 10/85* (2013.01); *H04L 9/32* (2013.01)

(58) Field of Classification Search
CPC ....... H04L 9/0852; H04L 9/32; H04B 10/508; H04B 10/85; H04B 10/5165; H04B 10/70
USPC .................................................. 398/146, 179
See application file for complete search history.

(56) References Cited

U.S. PATENT DOCUMENTS

| | | | | |
|---|---|---|---|---|
| 5,680,491 A | * | 10/1997 | Shigematsu | ....... G02B 6/29377 385/123 |
| 2004/0086280 A1 | | 5/2004 | Duraffourg et al. | |

OTHER PUBLICATIONS

International Search Report dated May 20, 2015 in related International Application No. PCT/US14/46905, 17 pages.

(Continued)

*Primary Examiner* — Leslie C Pascal
(74) *Attorney, Agent, or Firm* — Pierce Atwood LLP; Kevin M. Farrell; Christopher A. Baxter

(57) ABSTRACT

Multiple bit values can be encoded on a single photon in a quantum key distribution (QKD) system using a plurality of sidebands of an optical carrier frequency. Computational and conjugate bases can be defined, and photons decoded based on a selected state from either basis. If n sidebands are available, as many as $\log_2 n$ bits can be encoded on a single photon. Errors in detected bit values due to selection of an incorrect basis state or other errors can be at least partially corrected by bit distillation to identity bit strings for which a transmitter and a receiver record the same values, without insecure transmission of these values.

16 Claims, 7 Drawing Sheets

(56) References Cited

OTHER PUBLICATIONS

Capmany et al., "Optimum Design for BB84 Quantum Key Distribution in Treetype Passive Optical Networks," IITEAM Research Institute, Universidad Politecnica de Valencia, Spain, Journal of the Optical Society of America B, 27, pp. A146-A152, Mar. 24, 2011, 24 pages.

Kibler et al., "Observation of Kuznetsov-Ma Soliton Dynamics in Optical fibre," Scientific Reports, 2, 463, Jun. 18, 2012, pp. 1-5, 5 pages.

* cited by examiner

LONG-HAUL HIGH RATE QUANTUM KEY DISTRIBUTION

CROSS REFERENCE TO RELATED APPLICATION

This application claims the benefit of U.S. Provisional Application No. 61/847,002, filed on Jul. 16, 2013, which is incorporated herein by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The disclosure pertains to quantum cryptography.

BACKGROUND

Increasing the secret bit rate of a Quantum Key Distribution (QKD) system based on Bennett and Brassard's 1984 protocol (BB84) by dialing-up the clock rate of existing QKD approaches using a two-dimensional Hilbert space spanned by photon polarization (1 bit per photon ("bpp")) is difficult because of restrictions imposed by detector timing jitter and deadtime. Higher secure rates could be achieved using other photon degrees of freedom, and transmitting multiple bits per photon. Higher-order alphabet quantum coding must be robust to decoherence from atmospheric turbulence and atmospheric or fiber-optic dispersion. Unfortunately, conventional higher order alphabet based approaches are unsuitable for practical applications.

Several photon degrees of freedom have been used in higher-order alphabet quantum communications across atmospheric paths. Spatial, temporal, and photon optical angular momentum (OAM) modes can provide a large number of Hilbert space dimensions but none of these approaches provides secure, robust systems that actually produce secret keys at rates that can approach 1 Gbs. Existing modulation methods for OAM modes use mechanical or liquid crystal devices that remain far from the GHz clock rates that are necessary to achieve the 1 Gbps goal. Such states are not robust to weak turbulence and require full adaptive optics for the limited weak turbulence periods when such communications are possible. This method of encoding is also not amenable to transmission through standard single-mode fiber.

Time-bin encoding of quantum information in a higher-order alphabet would be robust under atmospheric transmission, but the necessary serialization of quantum information over multiple time bins limits the secure rate. For example, if a 1000 state time bin alphabet were required and detector jitter was 20 ps, each individual pulse would need to be 20 ns apart, limiting overall transmission rate to 50 MHz. This reduced transmission rate negates the advantages of the high-order alphabet.

Entangled photon QKD is limited by the speed and performance of the source of entangled photons. It is also frequently suggested that the non-locality of quantum physics provides a higher level of security assurance than prepare and measure schemes. However, this assertion hinges critically on the "fair sampling" assumption, which cannot be assumed to hold in the adversarial cryptographic setting. This assumption can be exploited to produce a completely insecure system, in spite of non-locality.

Continuous variable (CV) QKD is another approach that may be effective over atmospheric paths. However, the security analyses of these approaches have yet to reach the high assurances levels and sophisticated protocol techniques (decoy state and finite statistics) already developed and demonstrated for single-photon QKD.

Quantum noise encryption using the Y00 or alpha-eta protocol has some quantum optical similarities with CV QKD. This technique has been demonstrated at rates approaching 1 Gbps over hundreds of kilometers of optical fiber, and recently over an airplane to ground optical path. Nevertheless, this approach remains highly controversial. First, the transmitter and receiver require a shared long-term secret key: secure distribution of this key is not addressed. In contrast, QKD only requires a short, one-time short-term secret key for authentication of the first session. Once QKD commences, it is of no consequence if this initial key becomes compromised owing to the forward security of QKD. Second, this long-term secret key is used as the seed of a deterministic random number generator (DRNG) whose output feeds the Y00 encryptor. It has been shown that Y00 is therefore no more secure than the underlying DRNG, i.e., Y00 has algorithmic, not quantum physical security, at best. Third, Y00 quantum state outputs reveal information about the secret key, which is something that no encryptor should do: Y00 is less secure than an encryptor using the DRNGs directly as stream ciphers. Thus, the Y00 approach lacks strong security assurances.

SUMMARY

Methods of quantum key distribution comprise encoding at least one key bit as at least one sideband frequency modulated onto an optical carrier, and transmitting the modulated optical carrier. In some examples, multiple bit values are encoded on the optical carrier based on a plurality of sideband frequencies. In further examples, key bits are modulated based on a computational basis and a conjugate basis, wherein the computational basis corresponds to a plurality of carrier frequency sidebands and the conjugate basis is based on a superposition of carrier frequency sidebands of the computational basis. In some embodiments, an integer number of bits $\log_2 n$ is encoded based on n sideband frequencies. In representative examples, the optical carrier is a single mode, continuous wave laser beam or a mode-locked laser beam. In further embodiments, the optical carrier is modulated so that the modulation corresponds to at most one photon at a carrier frequency. In further examples, a basis state is selected and the modulated optical carrier is processed based on the selected basis state, and a value of a received bit is assigned based on the processing. In some examples, a basis state is selected and the modulated optical carrier is processed based on the selected basis state, and a plurality of received bit values is assigned based on the processing.

Apparatus comprise an optical source configured to produce an optical carrier beam and an optical modulator situated to receive the optical carrier beam and encode at least one key bit on the optical carrier beam based on at least one frequency sideband. In some examples, the optical modulator is configured to encode the at least one bit based on a set of computational states and a set of conjugate states, wherein the computational states correspond to frequency sidebands and the conjugate states are associated with combinations of the computational states. In other examples, the optical modulator is configured to modulate based on a conjugate state by inverting a phase of a sideband modulation. In some embodiments, the optical carrier beam is a CW laser beam or a mode-locked laser beam. A beam monitor is configured to determine that a total encoding modulation corresponds at most to a selected number of photons, wherein the selected number of photons is 1, 2, 5, 10, or 20. Typically a small number of photons (for example, 1 photon) is used. In still other examples, the modulated optical beam is demodulated based on a selected computational state or conjugate state.

In additional embodiments, a processor is configured to identify at least some incorrectly detected bits by receiving an XOR of transmitted bit strings with a bit string based on a random number, and computing an XOR of the received XORs with a detected bit string. In typical examples, communications for the identification are conducted using a conventional communication channel. In particular examples, the processor is configured to transmit an indication of accepted bit strings based on the computed XORs.

Methods comprise establishing values for a plurality of detected bits corresponding to transmitted bit values, wherein the detected bit values are established based on a quantum communication and a selected basis state from a plurality of basis states for the quantum communication. Bit strings based on processing transmitted bit values with bit strings based on a random number are received, wherein the received bit strings are communicated in a non-quantum communication channel. Accepted bit strings are identified by processing the received bit strings with corresponding bit strings based on the values of the detected bits. In some examples, the received bit strings correspond to XORs of the transmitted bit strings with a bit string defined by a random number. In still other examples, the received bit strings are processed by XORing the received bit string and a corresponding detected bit string.

According to some examples, communication systems comprise a soliton source that produces an optical soliton and a modulator that modulates the optical soliton bases on at least one quantum key bit so as to produce a soliton sideband. The modulated soliton is coupled to an optical transmission medium having a dispersion selected so that the soliton and the soliton sideband co-propagate over in the transmission medium over a distance of at least 5, 10, 15, 20, 30, 40, 50, 60, 70, 80, 90, 100, 120, 150, or 200 km. In some examples, the transmission medium includes at least a first optical fiber and a second optical fiber, wherein the first optical fiber and the second optical fiber have dispersions that are opposite in sign. In some embodiments, the second fiber is a dispersion compensating fiber or a dispersion shifted fiber. In other alternatives, lengths of the first fiber and the second fiber are selected to compensate dispersion between the soliton and the soliton sideband. In typical examples, the dispersion of the second fiber is between about −49 and −30 ps/nm/km and a receiver is coupled so as to receive the modulated sideband from the optical transmission media.

Methods comprise modulating a soliton based on at least one quantum key bit so as to encode the quantum key bit on a soliton sideband. The modulated sideband is transmitted so that the soliton sideband and the soliton co-propagate in a transmission medium. In one example, the transmission medium comprises a first optical fiber and a second optical fiber, wherein the first and second optical fibers have different dispersions and first and second fiber lengths and dispersions are selected so that the soliton and the soliton sideband co-propagate between a transmitter and a receiver.

The foregoing and other objects, features, and advantages of the invention will become more apparent from the following detailed description, which proceeds with reference to the accompanying figures.

BRIEF DESCRIPTION OF THE DRAWINGS

FIG. 8B illustrates a representative modulation, and FIGS. 8A, 8C depict an unmodulated and modulated soliton, respectively.

DETAILED DESCRIPTION

Figure 1:
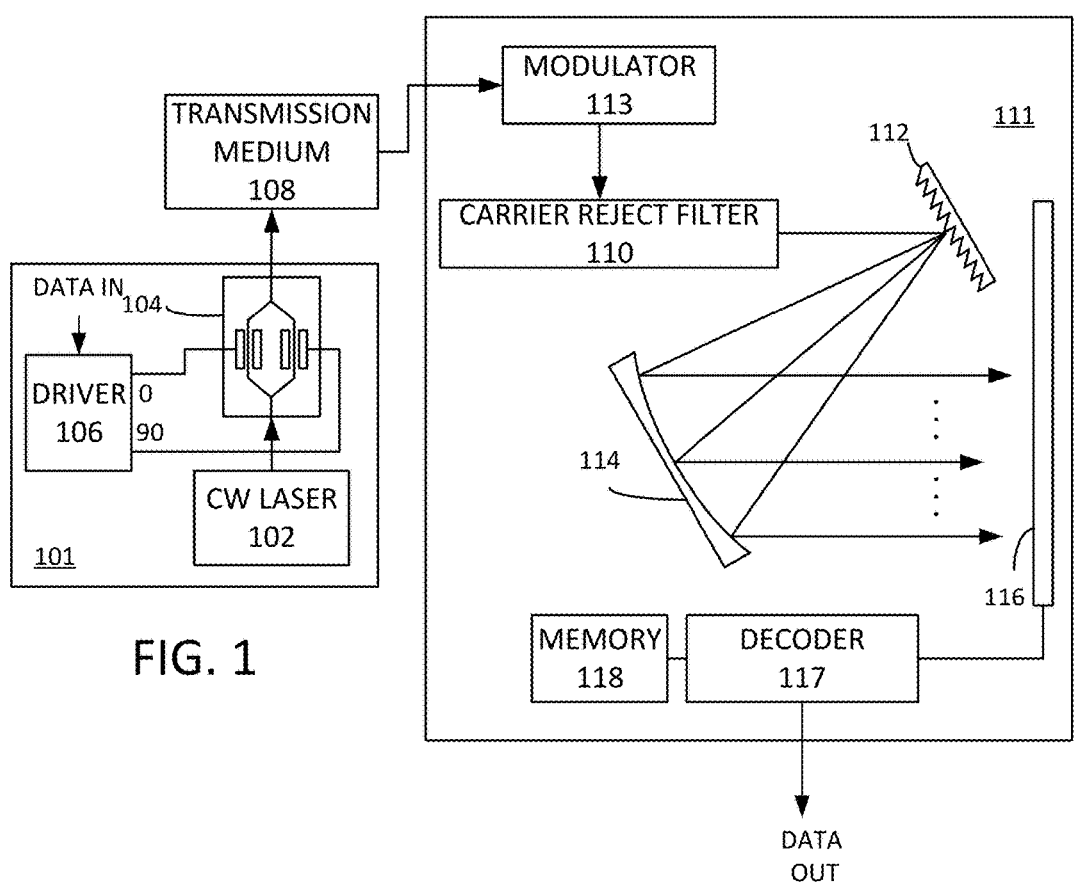
FIG. 1 illustrates a transmitter/receiver system configured for quantum key distribution (QKD) based on sidebands modulated onto an optical carrier.

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

In some examples, values, procedures, or apparatus' are referred to as "lowest", "best", "minimum," or the like. It will be appreciated that such descriptions are intended to indicate that a selection among many used functional alternatives can be made, and such selections need not be better, smaller, or otherwise preferable to other selections.

Disclosed herein are QKD systems that can provide high bit rate quantum communications, and can produce quantum key bits at rates ≥1 Gbs. High clock rates for each photon transmission (such as 10 MHz) and an extended Hilbert space, or number of degrees of freedom, are used in data encoding so that symbols from larger alphabets are received, providing multiple secret bits per photon.

Disclosed herein are systems and methods that combine a multi-dimensional Hilbert space with a high transmission rate and high efficiency read-out via imaging single photon detectors or an array of single photon detectors. The encoding methods can use very large symbol alphabets only limited by dispersion in the transmission medium. Because the system could have thousands of states available to send and receive, many bits of secure data can be sent on a single photon. This enables production of secret key bits at high rates. For example, present-generation single-photon detector timing jitter limits clock rates to 1-10 GHz for a secure system, so with typical secure link efficiencies of $10^{-3}$-$10^{-2}$ secure symbols per photon, a Gbps secure rate goal necessitates transmitting symbols from a higher-order alphabet representing multiple random bits per clock cycle. A quantum information encoding of 10 bpp, at a secure rate of 1 Gbps would be feasible at a 10 GHz clock rate and a link efficiency of $10^{-2}$ secure symbols per photon.

A QKD protocol has several steps involving both one-way quantum and bi-directional, conventional communications, as well as computational steps. The transmitter (Alice) and receiver (Bob) share a short, secret initial authentication key. First, Alice and Bob prepare and measure a sequence of photonic quantum states. "Decoy states" such as previously implemented in the BB84 protocol can be used. These decoy states incorporate finite statistics effects, requiring preparation of photon states with different average photon numbers. Next, through conventional communications, Alice and Bob down-select to signals with compatible preparations/measurements, forming "sifted" keys, which would be perfectly correlated in an ideal system. Alice and Bob perform error correction to reconcile their sifted keys. They also compare the average photon number of states Alice sent with those received by Bob and determine the percentage of the sifted key that was produced from single photons. From the error and single photon rates they establish an upper bound on the partial information that an eavesdropper (Eve) might have obtained, which determines how much privacy amplification (PA) they must apply to their reconciled key to produce a shorter, secure key. The public communications are authenticated to protect against man-in-the-middle attacks. All of these steps are essential for Alice and Bob to produce secure keys with QKD, but the following description pertains to the first step, the quantum communication of single photons from Alice to Bob. The other steps will proceed as described above except where noted below.

Quantum communications systems can be based on multiple states that are used to produce quantum keys. For example, a 3-state system can be based a first state, labeled |1>, a second state labeled |2>, and a third state that is a superposition of the first and second states, such as $(|1>+|2>)/2^{1/2}$. More generally, a theoretically unlimited set of states |1>, |2>, |3>, . . . , |n> is available. This set of states provides a first basis (referred as a computational basis) used to send quantum states for quantum key generation. A second, conjugate basis, is formed using superpositions of these states such as $(e^{if_1}|1>+e^{if_2}|2>+e^{if_3}|3>\ldots +e^{if_4}|n>)*n^{1/2}$, wherein fi represents phase terms that are independently selectable for each state. Computational and conjugate bases can be interchanged, if desired. Coherent frequency encoding/decoding of multiple bits of quantum information per photon (as used herein, frequency-coded QKD or FC-QKD) in multiple radio-frequency (RF) sidebands can be used. These sidebands can be added to a single carrier or used with multiple optical carriers. In either case, these sidebands provide a multi-dimensional Hilbert space spanning many optical frequencies. The transmitter (Alice) in this FC-QKD system uses a CW laser that emits an optical beam having a spectral width that is typically a few kHz wide. Quantum information is contained in the coherence between sideband amplitude and the carrier. Sideband modulation depths are chosen to produce an output that has a mean photon number per pulse (μ) less than one. Carrier and sidebands are then transmitted to a receiver (Bob), where the different wavelengths (frequencies) are injected into a single optical modulator, and short-pulse RF sideband frequency modulation is applied to each carrier. This modulation produces sideband amplitudes that interfere with Alice's so as to accomplish coherent encoding/decoding required for QKD. Readout is achieved by converting frequency encoded quantum information into spatial information using a wavelength dispersing element such as a grating or prism in the receiver, and then using a single-photon imager with high temporal/spatial resolution, or an array of single photon detectors possibly coupled through fibers aligned with a fiber collimator array.

Figure 2A:
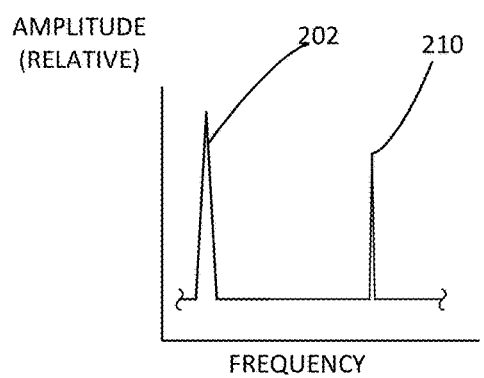
FIG. 2A illustrates modulation of one of many sidebands for QKD corresponding to transmission of a computation state.

FIG. 1 illustrates a representative system based on a transmitter 101 that includes a single mode, CW laser 102. An optical beam from the laser 102 is coupled to a modulator 104 that is configured to produce frequency sidebands based on an electrical modulation signal produced by a modulator driver 106. The single mode optical beam from the CW laser 102 provides a single carrier frequency; additional carrier frequencies can be provided by combining one or more additional single mode optical beams at different wavelengths. A representative sideband 210 of a carrier frequency 202 is shown in FIG. 2A. A plurality of sidebands is generally available, and these sidebands form a first set of states referred to herein as "computational states" to be used in QKD.

Modulation can be provided to produce a suitable number of sidebands, and in some examples, only positive or negative sidebands are produced. In one example, the modulator 104 is a Mach-Zehnder interferometer and the modulator driver 106 applies electrical signals that are 90 degrees out of phase to interferometer arms. A number of available sidebands depends on a desired sideband separation and an available maximum modulation frequency. For example, for a 2 GHz sideband separation and a 40 GHz maximum modulation frequency, as many as about 32 sidebands can be produced. Generally, if n sidebands are available, $\log_2 n$ data bits can be encoded in a single symbol. For $n=32=2^5$ 5 bits can be encoded in each symbol. Sideband modulation is generally configured so that an associated mean photon number is less than one.

In the example of FIG. 1, a single carrier frequency associated with the single mode optical beam is modulated, but multiple optical beams at different carrier frequencies can be modulated to produce sidebands with the same or different frequency separations and combined for transmission of additional data bits. Alternatively, beams in orthogonal states of polarization (SOPs) can be modulated and combined for transmission.

A receiver 111 is configured to receive the modulated optical carrier from the transmitter 101 via a transmission medium 108 such as an optical fiber or the atmosphere. A modulator 113 is coupled to selectively produce sidebands that interfere with sidebands produced by the transmitter 101, and a carrier reject filter 110 removes or attenuates the optical carrier. A grating 112 separates the sidebands that are then directed and focused by a reflector 114 or other optical system to a detector array 116. Detector array outputs are processed by a signal processor/conditioner 117 and can then be stored as digital or analog values in memory 118 such as RAM, or other computer readable media or computer readable storage device such as a hard disk. Detection in a selected computational states or conjugate states is based on an associated modulation applied by the modulator 113.

In one example, a compact optical system for spatial separation of frequency sidebands band is possible with sidebands about 1 GHz apart with a spacing of at least 2 GHz between the first sideband and the carrier to prevent carrier leakage into the sidebands. To increase the Hilbert space still further, additional carriers, each with its own phase modulator, can be used in the transmitter, but decoded by a single phase modulator in the receiver.

Figure 2B:
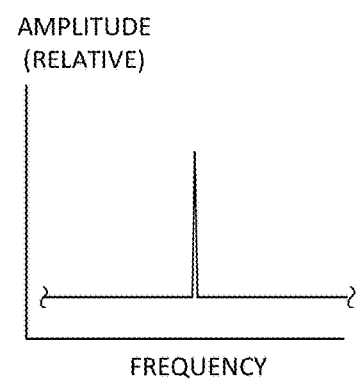
FIG. 2B illustrates a receiver side modulation applied to a computational state shown in FIG. 2A.
Figure 2C:
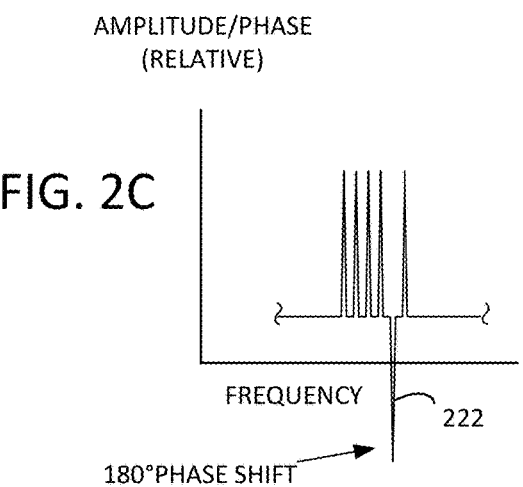
FIG. 2C illustrates modulation side bands for QKD corresponding to transmission of a conjugate state in which a phase of one sideband is inverted.

The system of FIG. 1 can be used in a variety of prepare-and-measure QKD schemes. For example, members of a first set of orthogonal states can represent symbols that will be used to form a shared key, while members of a conjugate set of equal amplitude superpositions of the first set is used to characterize channel disturbances arising from eavesdropping. Such a higher-dimensional QKD protocol can be realized with considerably less experimental complexity and cost than a mutually unbiased bases-protocol. In such a system, a transmitter such as that of FIG. 1 ("Alice") prepares approximately single-photon states randomly selected from the following sets: a) "computational states" containing a photon in a single sideband, from which secret key bits are produced (see, for example, FIG. 2A), and b) "conjugate states" containing a photon in a coherent equal amplitude superposition of all sidebands with equal RF phases, except for one sideband's phase which is flipped in sign as shown in FIG. 2C.

Figure 2D:
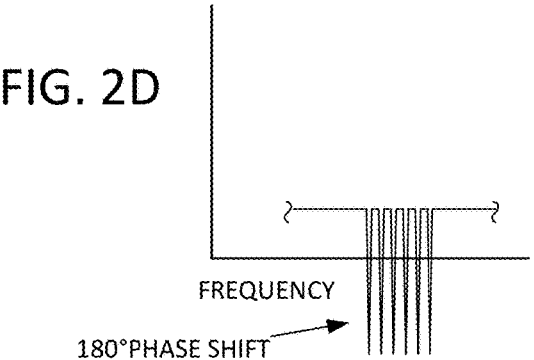
FIG. 2D illustrates a receiver side modulation applied to detect the conjugate state shown in FIG. 2C.

At the receiver 111 ("Bob") computational and conjugate state measurements are made by directing the received signal onto the grating 112 and detector(s) 116. For computational state measurements, Bob applies a modulation at the selected computational state sideband frequency and then removes the carrier. Such a modulation is shown at FIG. 2B. Bob makes conjugate state measurements by first applying an equal amplitude modulation to all sidebands as shown in FIG. 2D. Each set contains $2^n$ states, where n=number of bits/photon (bpp). As in the "biased basis BB84" protocol, for security it is not necessary to have equal fractions of signals in each of the two sets, provided the error analysis is performed separately for each set. Therefore, the majority of signals (for example, 90%) are prepared and measured in the computational set requiring no modulation by Bob, and 10% are chosen from the conjugate state set for channel disturbance characterization.

Once the signals have been detected, Alice and Bob can use conventional communications to select out two "sifted" symbol sets: a) "computational sifted" symbols, for which both used computational states, and b) "conjugate sifted" symbols, for which both used conjugate states. An eavesdropper (Eve) can neither obtain complete information about Alice's symbols nor measure them without introducing a disturbance. For instance, in a simple intercept/resend attack, if Eve makes a conjugate state measurement of a computational state from Alice, Eve will have reduced probabilities of getting the symbol correct or incorrect. On the other hand if Eve makes a computational state measurement of a conjugate state from Alice, Eve will forward a computational state to Bob leading to a high error probability in Bob's conjugate sifted set. In a perfect system in each of these sifted sets, Alice's symbols would be perfectly correlated with Bob's. Such a scheme could be implemented with multiple wavelengths lying in a few-nm wide band, across which atmospheric or fiber transmittance (depending on the system type fiber or free-space to be implemented) is high, dispersion is low, and single-photon detection is possible with good efficiency (10% or more), low dark noise ($<10^{-5}$/ns) and after-pulsing probability, short dead-time ($<1$ ns), and low timing jitter (100 ps or less).

The probability of producing a "computational sifted" symbol per clock period may be estimated under the assumption of 10% transmittance through a laboratory-scale channel, including receiver collection and optical losses, and a mean photon number of $\mu=1$ at the exit of the transmitter:

$$P(\text{computational sifted})=0.9\times0.9\times0.1\times0.1=8\times10^{-3}$$

which is the product of the probabilities that both Alice and Bob select the computational case, the channel transmittance, and the detection efficiency. This number must be multiplied by the clock rate, the number of bpp, and a privacy amplification (PA) factor to estimate a secure rate. Extrapolating from BB84 experiments in low bit error rate (BER) regimes, a PA factor of 0.5, yields a baseline performance projection of 1 Gbs with a transmission rate of only ~1 GHz. This suggests that a secure rate that is within reach of a 1 Gbps target is feasible using 40 GHz-bandwidth modulators in a multi-carrier design (e.g. 32 carriers each with 32 sidebands for 1024 states or 10 bpp), provided the error rate can be kept sufficiently small. A number of options are possible for further increasing the secure rate, including using cryogenic detectors for less deadtime, timing jitter, and noise.

There are several sources of error in the computational sifted set. First, Alice's sideband modulation could have some crosstalk into adjacent sidebands. This can be avoided by ensuring that the RF pulse is sufficiently long to allow narrow sidebands, which in turn requires sufficient separation between the carrier and the first sideband. Next, dispersion from the atmosphere or fiber could in principle introduce different propagation delays between different sidebands leading to inter-symbol interference (ISI). However, over the amount of optical bandwidth with 1024 sidebands spaced 1 GHz apart for a total of ~1 THz in bandwidth, this is no more than ~ps even on an atmospheric space to ground path and is therefore negligible. In fiber, a wavelength region around the zero dispersion point or dispersion compensation can be used.

There are additional sources of errors in the conjugate sifted symbol set. Modulation amplitude errors between Alice and Bob of as much as 10% lead to only an about 0.5% reduction in visibility. Atmospheric dispersion produces an additional phase between different sidebands, amounting to ~0.3 degrees at STP over a 1-m air path at STP between sidebands separated by 32 GHz. This will be a slowly varying function of meteorological conditions and can be compensated with RF "phase tweakers" at Bob during an occasional tune up. De-phasing due to atmospheric dispersion across a given sideband amounts to 0.006 degrees/km/MHz at sea level at STP, and so can be avoided as a significant error source with sufficiently narrow sidebands. Again, this requires sufficient separation between the carrier and first sideband relative to the pulse length. Finally, air turbulence will introduce small random phase fluctuations between different sidebands: at sea level at STP a 0.1° C. fluctuation in air temperature over a 1 m segment of path will introduce a 0.2 arcsec phase difference between sidebands that are 32 GHz apart. Control of these and other error sources, coupled with secure protocol design can be provided so that bit error ratios in the few percent range are attainable.

Noise, whether due to detector noise, background, encoding/decoding errors or decoherence, is a greater challenge for QKD using a higher-order alphabet than in a BB84 system: with 10 bpp, one symbol error could introduce as many as ten bit errors. A low error rate encoding/decoding scheme for high-dimensional quantum information, capable of GHz clock rate operation, that is robust to decoherence from atmospheric turbulence and dispersion is therefore valuable. Frequency-coded quantum information is robust to atmospheric decoherence owing to the small amount of dispersion (~fs/km/nm at 780 nm at STP) and the essentially frozen turbulence on the time scales of relevance. Another critical issue for security is how to assign bit values to symbols, and at what stage of the QKD protocol these assignments should be made. Depending on the dominant error mechanism, a poor choice of bit assignment could lead to a higher BER than necessary. Further, an adversary's partial information is on the symbols, and so it might be preferable for security to delay making the assignment of bits to symbols until the later stages of the protocol, and even to consider a variety of choices of assignment that could be made on the fly.

The computational and conjugate states could also be produced by using mutually unbiased bases built using the two phase settings as shown in FIGS. 2A and 2C. Alice can choose between multiple phase encodings for each sideband while Bob selects one of a set of interfering sideband settings such as all 0° or 90° phase pumping of all sidebands in the receiver side modulator.

Figure 3A:
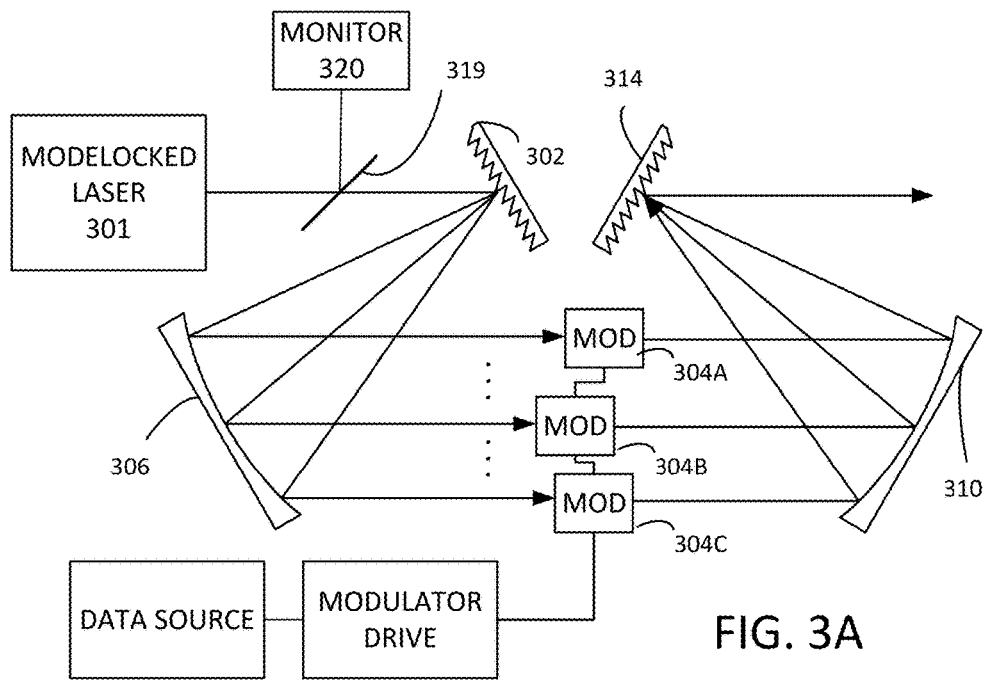
FIG. 3A is a block diagram of a transmitter for QKD based on modulation of mode locked laser beam.
Figure 3B:
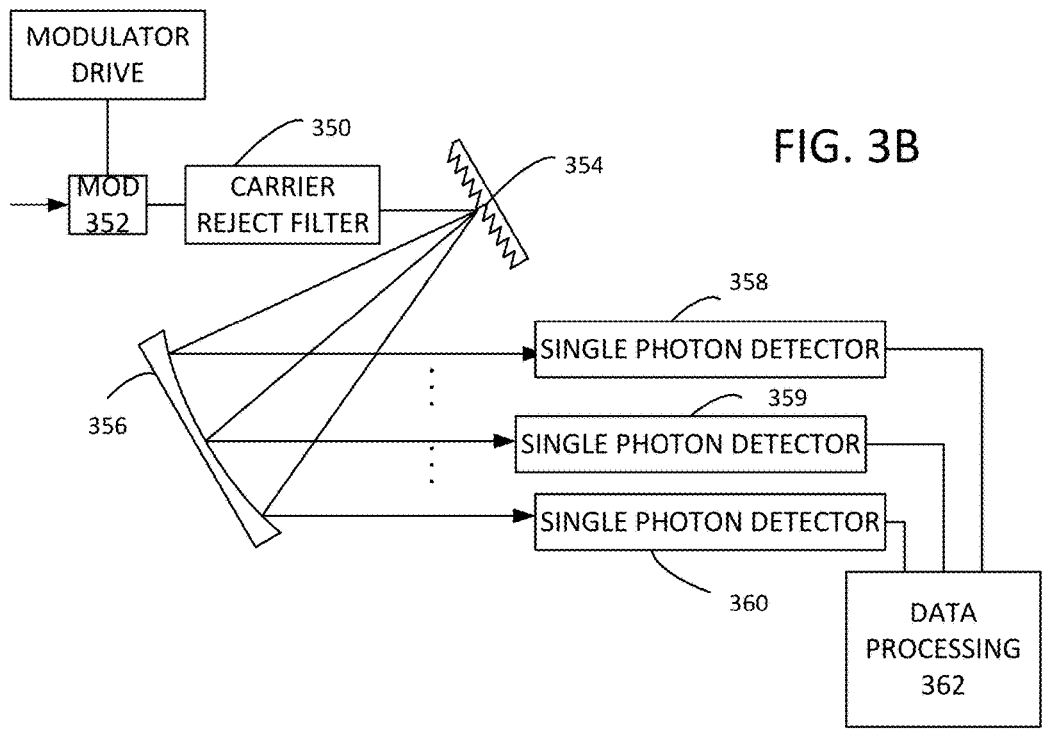
FIG. 3B is a block diagram of a receiver configured to communicate with a transmitter such as shown in FIG. 3A.
Figure 4A:
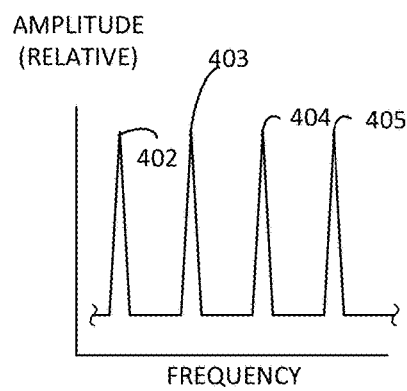
FIG. 4A illustrates a selection of carrier frequencies available in a mode locked laser beam.
Figure 4B:
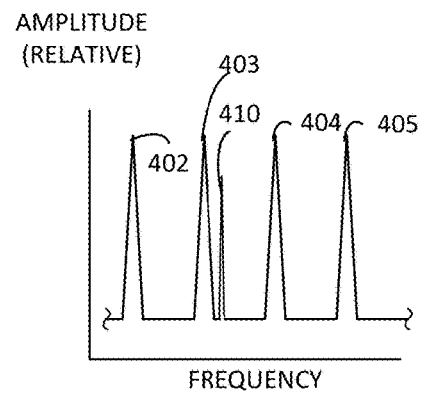
FIG. 4B illustrates modulation of a selected carrier frequency of FIG. 4A corresponding to a computational state.

In another alternative system illustrated in FIGS. 3A-3B, a number of available sidebands in an FC-QKD system can be increased using a mode-locked laser (MLL) 301 from which a few nm-wide band is selected. This band is then spatially separated into multiple CW carrier wavelengths with a grating 302 and the carrier wavelengths are directed to respective modulators 304A-304C by a reflector 306 or other optical system. FIG. 4A illustrates available carrier wavelengths 402-405. Frequency-coded information is applied to one or more carriers as multiple, short pulse, low-modulation-depth RF single sidebands with the respective modulators. Only three carriers and the associated modulators are shown in FIG. 3A, but fewer or more can be used. A reflector 310 returns the modulated beams to a grating 314 to form an output beam for transmission to a receiver. In other examples, one or more carriers are transmitted without combination with other carriers, or carriers are combined so that two or more bundled carrier beams are transmitted to a receiver in multiple output beams. FIG. 4B illustrates a representative output spectrum showing the carrier 402 modulated so as to produce a sideband 403. The remaining carriers are shown without modulation. A conjugate state 410 is illustrated in FIG. 4C, and a corresponding receiver side demodulation is shown in FIG. 4D.

Quantum information is contained in the coherence between the sideband amplitude and the carrier. Sideband modulation depths are chosen to produce a transmitter output that has a combined mean photon number per pulse $\mu<1$. This level is adjusted and maintained by picking off a portion of the beam with a reflector 319 and directing this beam portion to a beam monitor detector 320. Based on detected power, the mode locked laser carrier power or modulator drive can be adjusted so that mean photon number is sufficiently small.

In some examples, sidebands are generally narrow, a few MHz width, with inter-sideband spacing of about 1 GHz. The wavelength region around 770-780 nm has good atmospheric transmittance with low dispersion, while the 1310 or 1550 nm bands can be used in fiber. An atmospheric system preferably produces the needed states in optical fiber because high efficiencies in modulation are best achieved by fiber-coupled components. Bob must collect Alice's beam into a single transverse mode with free-space to fiber coupling or in the case of a fiber system input directly into Bob's modulator. Because the sidebands are all equally spaced from each carrier, Bob can modulate all of the carriers at once with a single phase modulator. Alice requires a separate modulator for each carrier, as Alice must be able to individually control the phase of each sideband. One or more of representative frequencies 402-405 are selected A receiver for use with the transmitter of FIG. 3A is illustrated in FIG. 3B. A modulator 352 is situated to apply suitable modulations to the received sideband-modulated signals and a carrier reject filter 350 is configured to remove or attenuate the carrier frequency. A grating 354 separates the sidebands and a reflector 356 couples the selected sidebands to single photon detectors 358-360. For equally spaced sidebands, the modulator 352 can apply a modulation to all input carriers prior to dispersion by the grating 354. A data processing system 362 establishes bit values based on the demodulated, detected signals.

Figure 4C:
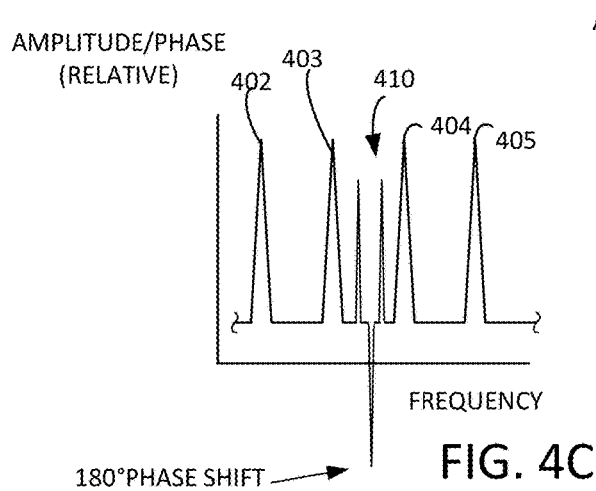
FIG. 4C illustrates a conjugate state associated with computational states such as the computational state shown in FIG. 4B.
Figure 4D:
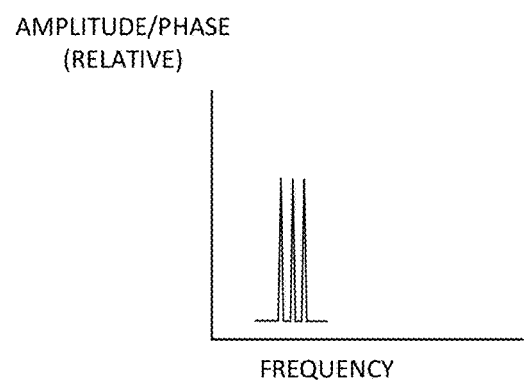
FIG. 4D illustrates a receiver side modulation applied to detect the conjugate state shown in FIG. 4C.

FIG. 4C illustrates a conjugate state 410 corresponding to sidebands of carrier frequency 403. One of the sidebands is out of phase with respect to the remaining sidebands. For both computation and conjugate states, a modulation depth can be selected so as to correspond to no more than one photon.

In systems based on either mode-locked or CW lasers, frequency sidebands can be used to encoded multiple bits with a single photon. Using such modulation techniques, a transmitter and receiver can communicate so as to establish a shared key. One method of establishing such a shared key is described below, but conventional approaches such as "sifting" can be used.

Frequency-Coded QKD on Solitons

Optical solitons can also be used with multi-bit, sideband modulation as described above. Optical solitons are brief (sub-nanosecond) pulses of light which propagate through optical fiber with no dispersion; the pulse is attenuated as it travels through the fiber, but the pulse envelope and optical phase are not distorted. A phase modulation can be imposed on solitons with modulation amplitude at a single-photon level. Fiber attenuation (typically 0.2 dB/km) can be overcome by periodically inserting amplification stages. Amplification inevitably degrades transmitter/receiver correlations but such degradation can be compensated using distillation as described above. Balancing of fiber loss and amplifier gain permits a propagating soliton to remain a fundamental soliton throughout. Any attempt by an eavesdropper to amplify and split off a copy will result in a higher-order soliton whose phase is not faithful to the original. Such a phase modulation technique also allows the encoding of multiple bits of information on one soliton pulse: multiplexing several frequency components on the imposed phase permits use of a higher-order alphabet as described above.

Optical solitons propagating in optical fiber are generally described with a hyperbolic secant envelope $u(t,z)=\text{sech}(t)\exp(iz/2)$, wherein z is a propagation distance, and t is time (with a mean time of flight to z removed), and gain or loss a in the fiber small enough to be neglected. The phase term in u(t,z) has no t-dependence; and propagation is completely nondispersive. This secant envelope can be obtained from a nonlinear Schrodinger equation:

$$-i\frac{\partial u}{\partial z} = \frac{1}{2}\frac{\partial^2 u}{\partial t^2} + |u^2|u - \frac{i}{2}\alpha u$$

The tendency for this sech-shaped pulse to travel through the fiber without changing its shape arises when the dispersive term exactly cancels the non-linear term. Such propagation is based on a combination of two equal and opposite effects: anomalous dispersion in the fiber, which tends to advance higher-frequency components and retard lower frequencies; and self-phase modulation due to $\chi^{(3)}$ nonlinearity in optical fiber, which tends to advance lower-frequency components and retard higher frequencies. Selection of fiber parameters and use of a fast-pulse laser can create a stable balance between the two, so that the pulse propagates without dispersion. Typical values for single-mode fiber at 1550 nm wavelength are pulse widths of twenty to fifty picoseconds, comprising $10^6$ photons. As soliton power falls due to attenuation, self-phase modulation is no longer sufficient to balance dispersion, and amplification is then required. Conversely, amplification with too much gain will create too much self-phase modulation and the soliton will break apart into constituent solitons and dispersive radiation. Consequently, periodic amplification is required to keep soliton energy within these two bounds. A distance between amplifiers is much less than a characteristic length $z_c$ associated with fiber dispersion D and pulse duration $\tau$ such that $z_c$ is about $0.25\ \tau^2/D$. For typical values, $z_c$ is hundreds of kilometers, suggesting that amplifier stages are needed every several tens of kilometers.

In long haul systems, a significant limitation on the achievable bit-rate is the so-called Gordon-Haus timing jitter. This jitter arises because each of the many amplifiers couples background noise into the pulse, effectively shifting its central frequency slightly. Group velocity dispersion of the fiber then retards or advances the pulse relative to its unshifted position. Each pulse accumulates a different summation of retardations and advances, and the result at the receiver is an increase in timing jitter. Traditionally, this obstacle can be overcome by inserting narrow wavelength filters in the channel, to coax the center wavelengths of each pulse to a common value.

Figure 8A:
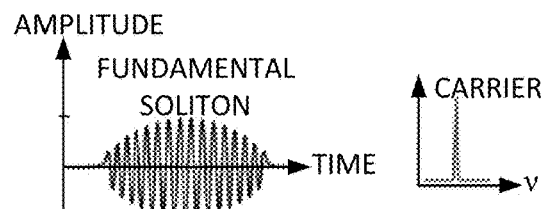
FIGS. 8A-8C illustrate phase modulation of a propagating soliton. Frequency-space representations are shown as insets.
Figure 8B:
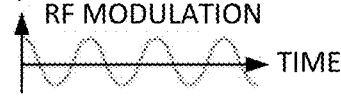
Figure 8C:
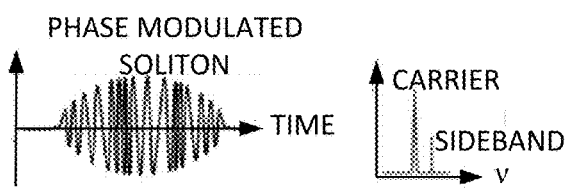

A transmitter (Alice) includes a soliton source and a phase modulator. Frequency-coded information is applied to each soliton pulse as multiple, short pulse, low-modulation-depth RF single sidebands as shown in FIGS. 8A-8C. FIG. 8A illustrates a soliton and its spectrum, FIG. 8B illustrates a representative applied modulation, and FIG. 8C illustrates the soliton as modulated. Quantum information is contained in the coherence between the sideband amplitude and the soliton carrier frequency. Sideband modulation depths are chosen to produce an output that has a low photon number per pulse. The soliton pulses with sidebands are transmitted to the receiver (Bob), where they are injected into a single optical modulator, and multiple, short-pulse RF sideband frequency modulation is applied to each carrier. Bob's modulation produces sideband amplitudes that interfere with Alice's so as to accomplish the coherent coding/decoding required for QKD. Readout is accomplished by converting frequency encoded quantum information into spatial information using a grating in the receiver, and then using an array of single-photon detectors to readout the detection states on each clock cycle by utilizing the device's high temporal/spatial resolutions. Transmitters and receivers are generally as shown in FIGS. 1 and 3A-3B, but with a soliton source.

Sidebands of a few MHz width (or less or more) can be used, with inter-sideband spacings of 1 GHz or more or less, and a spacing between the carrier and first sideband selected based on soliton pulse length. Bob's modulation produces sideband amplitudes that interfere with Alice's so as to accomplish the conjugate coding/decoding required for QC; this can be thought of as a (higher-dimensional) analog in frequency space of bright-reference-pulse (BRP) encoding/decoding of spatial/temporal quantum information such as described in C. H. Bennett, Phys. Rev. Lett. 68, 3121 (1992), which is incorporated herein by reference. Alice and Bob can share a common RF reference and clock, and conventional communications required in the QKD protocol can be accomplished electrically.

The disclosed methods and apparatus can be used with a variety of prepare-and-measure QKD schemes. For example, a 3-state protocol can be used in which members of one set of orthogonal states represent symbols used to form a shared key, while members of a conjugate set of equal amplitude superpositions of the first set is used to characterize the channel disturbance arising from eavesdropping. Such a higher-dimensional QKD protocol can be considerably less complex than a mutually unbiased bases-protocol. Therefore, in some examples, Alice transmits in approximate single-photon states randomly selected from the following sets: computational states containing a photon in a single sideband, from which secret key bits are produced, and conjugate states containing a photon in a coherent equal amplitude superposition of all sidebands with equal RF phases, except for one sideband's phase which is flipped in sign. Bob makes computational state measurements by directing his received signal onto his grating and detector array. He makes conjugate state measurements by first applying an equal amplitude modulation to all sidebands. Each set contains 2N states, where N=number of bits per photon (bpp). Further, as in the biased basis BB84 protocol, for security it is not necessary to have equal fractions of signals in each of the two sets, provided the error analysis is performed separately for each set. Therefore, the majority of the signals (for example, 90%) are prepared and measured in the computational set (requiring no modulation by Bob), and only 10% are chosen from the conjugate state set, for channel disturbance characterization.

Once the signals have been detected, Alice and Bob use conventional communications to select out two sifted symbol sets: computational sifted symbols, for which both used computational states, and conjugate sifted symbols, for which both used conjugate states. An eavesdropper (Eve) can neither obtain complete information about Alice's symbols nor measure them without introducing a disturbance. For instance, in a simple intercept/resend attack, if Eve makes a conjugate state measurement of a computational state from Alice, Eve will have equal probabilities of getting the symbol correct or incorrect. On the other hand if Eve makes a computational state measurement of a conjugate state from Alice, Eve will send on a computational state to Bob leading to a high error probability in Bob's conjugate sifted set.

Such approaches also permit wavelength-division-multiplexing of optical signals in the fiber. Solitons can be generated and modulated at several different wavelengths, combined before launch, and then demultiplexed and individually analyzed at the receiver.

Soliton-soliton interactions can be used in possible eavesdropping attacks. If a soliton of shorter wavelength is launched into the fiber behind a soliton of longer wavelength, the shorter one will eventually overtake the longer one due to anomalous dispersion of the fiber. As the solitons pass, they interact in ways that can transmit information from one to the other. For example, the field of one soliton will change the local index of refraction (due to fiber nonlinearity); the second soliton accumulates a phase shift as it passes through the area of changed index. In this way, the phase of the probe soliton contains information about the intensity of the signal soliton, without having affected the signal intensity at all. This effect is known as cross-phase modulation, and is the foundation for several quantum non-demolition (QND) methods. At first glance it might appear that the ability to perform an arbitrarily accurate measurement of a soliton's phase makes them wholly unsuitable for secure communication. However, a soliton's intensity and phase are conjugate variables; any measurement which yields information about one necessarily perturbs the other. In the experiments cited above, QND measurements of the photon number do yield complete information without affecting the number at all—but the signal soliton's phase is completely randomized. Eavesdropper measurements would have measurable impact on the photon number, and in this way the eavesdropper's presence would be revealed.

Transmission distance can be extended by increasing modulation amplitude beyond a single photon per pulse. Consider the case of an adversary who does not possess a quantum memory. Alice can transmit almost three photons in each pulse without loss of secrecy. This is because an eavesdropper performing an intercept-resend attack cannot reliably measure the quantum state of less than three photons, and a photon-number-splitting attack can be foiled by use of a decoy-state protocol. Conversely, an adversary with a perfect quantum memory could successfully attack a multiple-photon protocol by tapping off and storing in memory one photon from each pulse. After Alice and Bob announce their basis choices, the adversary could take photons from memory and measure them in the correct basis with perfect accuracy. Thus, there exists a trade-off between the size/fidelity of eavesdropper's quantum memory, and the maximum amplitude Alice may transmit. Recent research has shown that this bounded/noisy quantum storage model enables some cryptographic functions which are known to be impossible in the case of an unbounded adversary.

Bit Distillation

QKD protocols typically involve the transmission by Alice of a series of random bits encoded using a computational and a conjugate basis. A common encoding system is based on rectilinear and diagonal states of polarization (SOPs) that typically encode one bit per photon. After quantum bit transmission in QKD, at least some received bits (typically at least about 25%) are detected incorrectly, and a conventional communication channel can be used to improve accuracy without becoming more susceptible to eavesdroppers. A representative system for improving bit accuracy by processing bits as pairs (i.e., n=2 bits at a time) is illustrated below, but arbitrary length bit strings can be similarly processed. Detected bit values can be obtained based on single or multi-bit alphabets, and the following distillation procedure can be used with bit values established in any basis.

Figure 5:
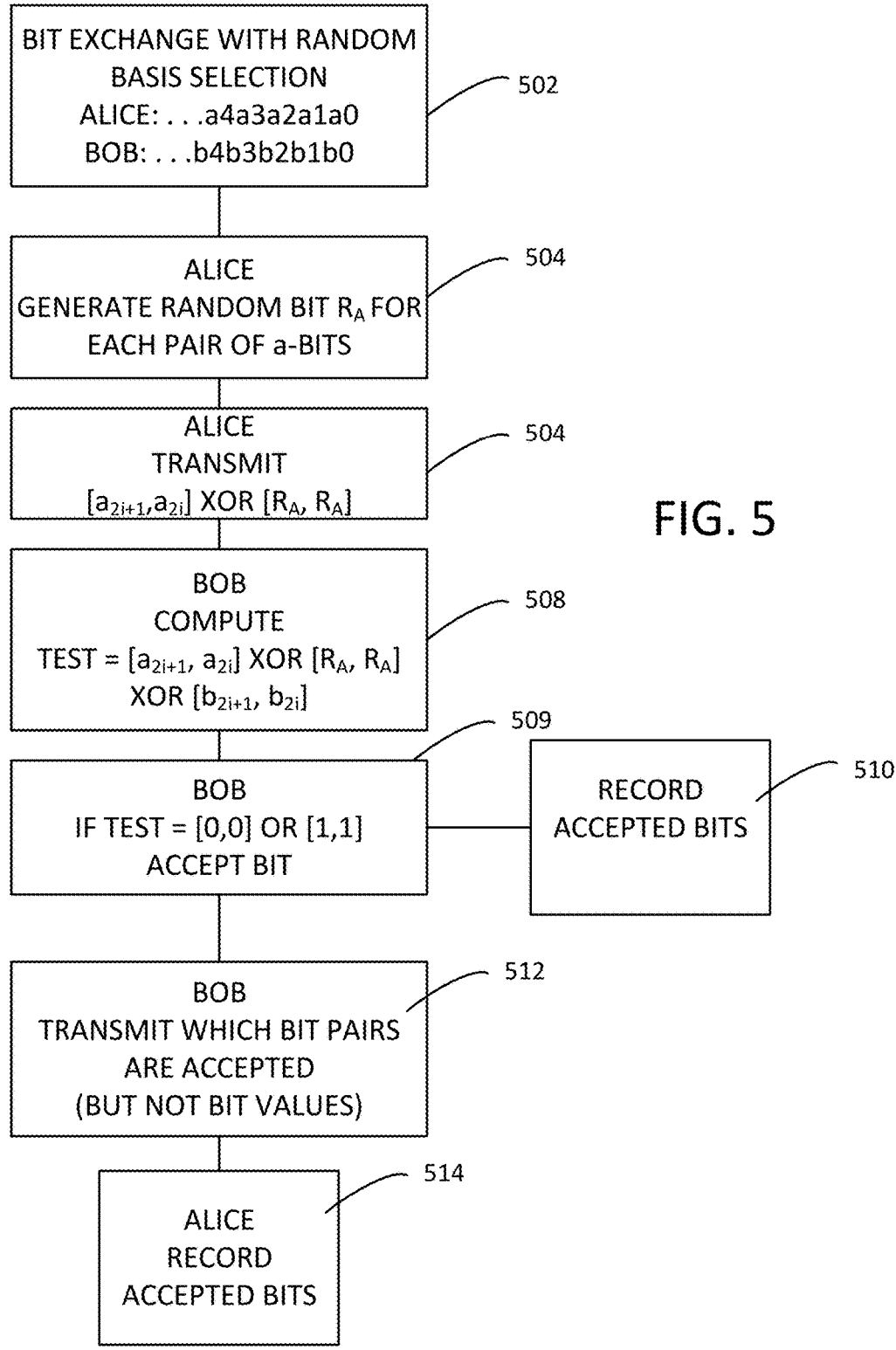
FIG. 5 illustrates bit distillation.

Referring to FIG. 5, at 502 Alice transmits a series of bits to Bob, and Bob selects a state (computational or conjugate) for measurement of each of the transmitted bits. For balanced basis SOP encoding, Bob is correct in basis state selection 50% of the time. Alice thus transmits a bit sequence a4a3a2a1a0 which Bob detects as bits b4b3b2b1b0, some of which do not correspond to the transmitted bits. Bit accuracy can be improve by distillation as follows using a conventional communication channel. At 504, Alice generates a random bit $R_A$ for each pair of bits and transmits $[a_{2i+1}, a_{2i}]$ XOR $[R_A, R_A]$ for each bit pair $[a_{2i+1}, a_{2i}]$ at 506. At 508, Bob then XORs corresponding received (i.e., detected) bit pairs $[b_{2i+1}, b_{2i}]$ with $[a_{2i+1}, a_{2i}]$ XOR $[R_A, R_A]$ transmitted by Alice. Bob accepts bit pairs at 510 only if the result is [0,0] or [1,1] as determined at 509. Bob transmits a message at 512 to Alice indicating which bit pairs are accepted. Alice then records the accepted bits at 514. Bob does not transmit actual bit values to Alice.

In other encodings, Bob can be correct or incorrect in basis state selection more or less frequently than in a two state, balanced basis encoding. In a 3 state protocol in which most bits (for example, 90%) are encoded in a computational state set requiring no modulation, and 10% are encoded in a conjugate state set, Bob would likely be correct more often than 50% (up to 90%). In a 4 state protocol, Bob could obtain a correct bit value half the time even when measurement is made in the wrong basis.

Figure 6:
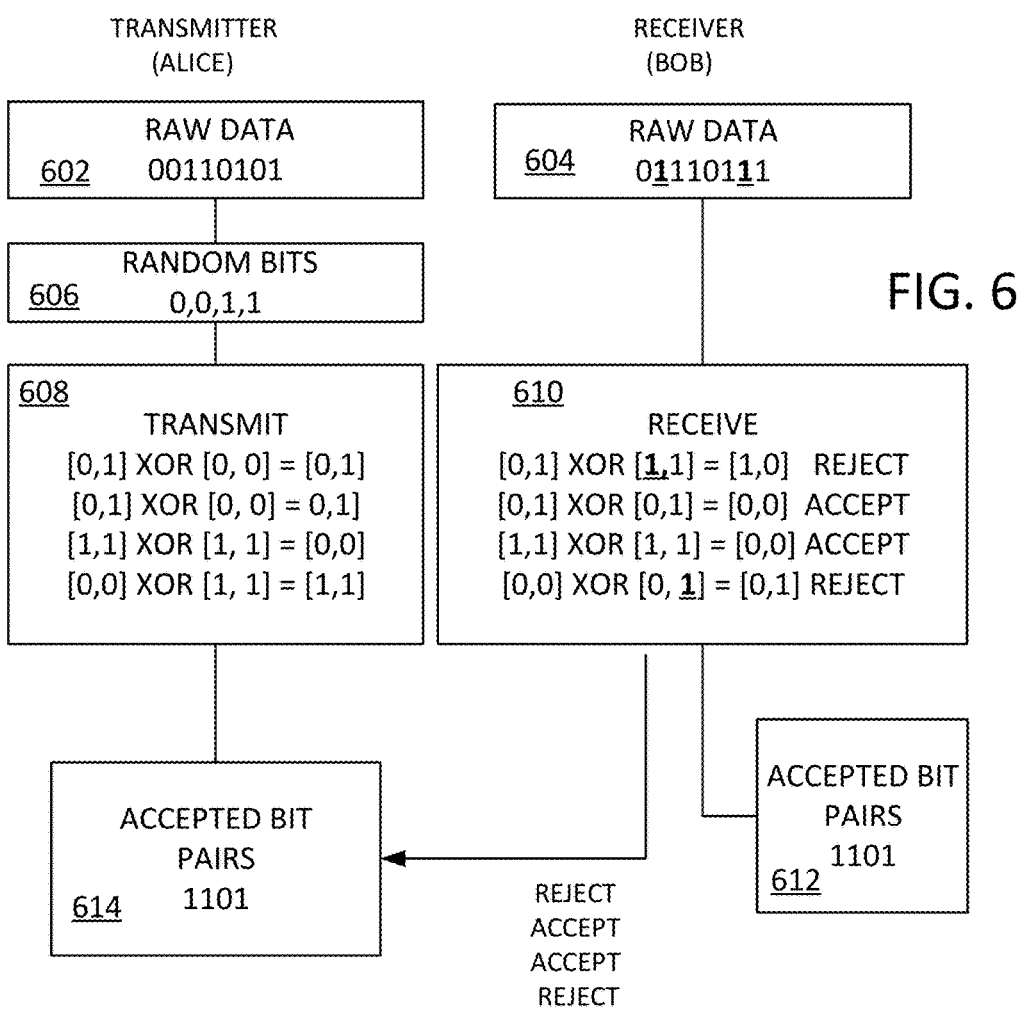
FIG. 6 illustrates bit distillation for selected representative bit values.

Processing of an example bit string is shown in FIG. 6. At 602, Alice transmits raw data via a quantum channel such as described above using suitable bases. Bob selects a basis state for detecting each bit, and records a detected value at 604. For convenient illustration, bit values associated with errors are shown in underline and boldface in FIG. 6. At 606, Alice selects a set of random bits and at 608, Alice transmits an XOR of each raw bit pair with a corresponding random number based bit pair via a conventional communication channel. At 610, Bob processes received bit pairs based on the XOR values from Alice and notifies Alice which bit pairs to accept, without sending bit values. At 612, 614, Bob and Alice identify accepted bit pairs.

Representative QKD System

Figure 7:
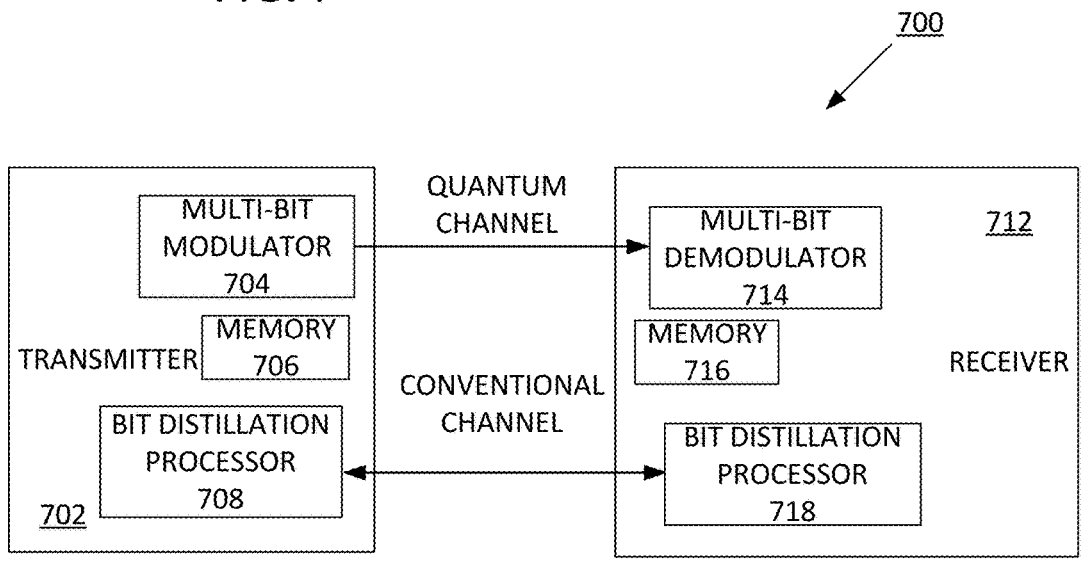
FIG. 7 illustrates a representative key exchange system using multi-bit encoding and bit distillation.

Referring to FIG. 7, a transmitter 702 and a receiver 712 are coupled via a quantum communication channel. Data from the transmitter 702 is modulated for transmission by a multi-bit modulator that encodes values for multiple bits on a single photon. The receiver 712 includes a multi-bit demodulator 714 that estimates bit values by demodulating a received multi-bit modulated carrier signal. Bits for transmission and detected bits can be stored in respective memories 706, 716. The transmitter 702 also includes a bit distillation processor 708 that is configured to, for example, generate random numbers, bit strings based on random numbers, as well as to execute logical operations such as XORs for bit distillation. The bit distillation processor 708 is coupled to a receiver side bit distillation processor 718 via a conventional communication channel. The bit distillation processor 718 performs logical operations and reports bit strings or bits that are to be accepted to the transmitter 702 via the conventional communication channel.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A communication system, comprising:
   a soliton source that produces an optical soliton; and
   a modulator that:
      modulates the optical soliton based on at least one quantum key bit to produce a soliton sideband, and
      causes the optical soliton and the soliton sideband to co-propagate in a transmission medium.

2. The communication system of claim 1, wherein the transmission medium includes at least a first optical fiber and a second optical fiber, wherein the first optical fiber and the second optical fiber have different dispersions.

3. The communication system of claim 2, wherein the dispersion of the first optical fiber is opposite in sign to the dispersion of the second optical fiber.

4. The communication system of claim 3, wherein the second optical fiber is a dispersion compensating fiber.

5. The communication system of claim 4, wherein a length of the first optical fiber is different than a length of the second optical fiber.

6. The communication system of claim 5, wherein dispersion of the second optical fiber is between about −49 and −30 ps/nm/km.

7. The communication system of claim 5, wherein the modulator causes the optical soliton and the soliton sideband to co-propagate in the transmission medium between the modulator and a receiver that receives the soliton sideband from the transmission medium.

8. The communication system of claim 2, wherein the modulator causes the optical soliton and the soliton sideband to co-propagate in the transmission medium between the modulator and a receiver that receives the soliton sideband from the transmission medium.

9. The communication system of claim 1, further comprising a receiver that receives the soliton sideband from the transmission medium.

10. The communication system of claim 1, wherein the modulator causes the optical soliton and the soliton sideband to co-propagate in the transmission medium between the modulator and a receiver that receives the soliton sideband from the transmission medium.

11. A method, comprising:
    modulating a soliton based on at least one quantum key bit to encode the at least one quantum key bit on a soliton sideband; and
    transmitting the soliton sideband such that the soliton sideband and the soliton co-propagate in a transmission medium.

12. The method of claim 11, wherein the transmission medium comprises a first optical fiber and a second optical fiber, and wherein the first optical fiber and second optical fiber have different dispersions.

13. The method of claim 12, wherein the first optical fiber and second optical fiber have different fiber lengths.

14. The method of claim 13, wherein the transmitting comprises transmitting the soliton sideband so that the soliton and the soliton sideband co-propagate in the transmission medium between a transmitter and a receiver that receives the soliton sideband from the transmission medium.

15. The method of claim 12, wherein the transmitting comprises transmitting the soliton sideband so that the soliton and the soliton sideband co-propagate in the transmission medium between a transmitter and a receiver that receives the soliton sideband from the transmission medium.

16. The method of claim 11, wherein the transmitting comprises transmitting the soliton sideband so that the soliton and the soliton sideband co-propagate in the transmission medium between a transmitter and a receiver that receives the soliton sideband from the transmission medium.

* * * * *